US007986241B2

(12) United States Patent
Copeland et al.

(10) Patent No.: US 7,986,241 B2
(45) Date of Patent: Jul. 26, 2011

(54) COMBINATION SECURITY TAG USING A PERIMETER RFID ANTENNA SURROUNDING AN EAS ELEMENT AND METHOD THEREOF

(75) Inventors: Richard L. Copeland, Lake Worth, FL (US); Wing Kei Ho, Boynton Beach, FL (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 784 days.

(21) Appl. No.: 12/020,322

(22) Filed: Jan. 25, 2008

(65) Prior Publication Data

US 2009/0189768 A1 Jul. 30, 2009

(51) Int. Cl.
*G08B 13/14* (2006.01)
*H04Q 5/22* (2006.01)
*H01Q 9/16* (2006.01)
*G06K 7/00* (2006.01)

(52) U.S. Cl. ................... 340/572.7; 340/10.4; 340/10.1; 340/572.1; 235/436; 235/439; 343/793

(58) Field of Classification Search ........................ None
See application file for complete search history.

(56) References Cited

U.S. PATENT DOCUMENTS 5,859,587 A 1/1999 Alicot et al.
6,147,606 A * 11/2000 Duan ......................... 340/572.7
7,183,917 B2 2/2007 Piccoli et al.
7,586,446 B2 * 9/2009 Sakama et al. ................ 343/702
7,750,792 B2 * 7/2010 Smith et al. .................. 340/10.4
2004/0233042 A1 11/2004 Piccoli et al.
2006/0044769 A1 * 3/2006 Forster et al. ................. 361/760
2007/0200705 A1 * 8/2007 Yamagajo et al. ......... 340/572.7
2008/0174437 A1 * 7/2008 Arguin ....................... 340/572.7

FOREIGN PATENT DOCUMENTS

WO 98/13804 A1 4/1998
WO 98/13805 A1 4/1998
WO 2007/135269 A1 11/2007
WO 2008/079827 A1 7/2008
WO 2009/025700 A1 2/2009

OTHER PUBLICATIONS

International Search Report and Written Opinion dated Mar. 25, 2009 for International Serial No. PCT/US2008/013652, International Filing Date Dec. 11, 2008 (13-pages).

* cited by examiner

*Primary Examiner* — Jennifer Mehmood
*Assistant Examiner* — Fekadeselassie Girma
(74) *Attorney, Agent, or Firm* — Alan M. Weisberg; Christopher & Weisberg, P.A.

(57) ABSTRACT

A security tag and system for securing objects, the system and security tag includes an acousto magnetic ("AM") electronic article surveillance ("EAS") component that has a housing with a defined surface area. The housing of the EAS component includes a perimeter boundary that defines an EAS component plane. The system and security tag further include a radio frequency identification ("RFID") component that includes an integrated circuit and a dipole antenna defining an RFID component plane that is substantially coplanar with the EAS component plane. The integrated circuit and the dipole antenna are positioned externally along the perimeter boundary of the EAS component.

19 Claims, 3 Drawing Sheets

COMBINATION SECURITY TAG USING A PERIMETER RFID ANTENNA SURROUNDING AN EAS ELEMENT AND METHOD THEREOF

CROSS-REFERENCE TO RELATED APPLICATION n/a

STATEMENT REGARDING FEDERALLY SPONSORED RESEARCH OR DEVELOPMENT n/a

FIELD OF THE INVENTION

The present disclosure relates to an electronic article surveillance ("EAS") label or tag for the prevention or deterrence of unauthorized removal of articles from a controlled area. More particularly, the present disclosure relates to a security tag that uses different combinations of EAS elements and radio frequency identification ("RFID") elements for tag detection.

BACKGROUND OF THE INVENTION

Electronic article surveillance ("EAS") systems are generally known in the art for the prevention or deterrence of unauthorized removal of articles from a controlled area. In a typical EAS system, EAS tags, markers and labels (collectively "tags") are designed to interact with an electromagnetic field located at the exits of the controlled area, such as a retail store. These EAS tags are attached to the articles to be protected. If an EAS tag is brought into the electromagnetic field or "detection zone," the presence of the tag is detected and appropriate action is taken, such as generating an alarm. For authorized removal of the article, the EAS tag can be deactivated, removed or passed around the electromagnetic field to prevent detection by the EAS system.

EAS systems typically employ either reusable EAS tags or disposable EAS tags or labels to monitor articles to prevent shoplifting and unauthorized removal of articles from the store. The reusable EAS tags are normally removed from the articles before the customer exits the store. The disposable tags or labels are generally attached to the packaging by adhesive or are located inside the packaging. These tags typically remain with the articles and must be deactivated before they are removed from the store by the customer. Deactivation devices may use coils which are energized to generate a magnetic field of sufficient magnitude to render the EAS tag inactive. The deactivated tags are no longer responsive to the incident energy of the EAS system so that an alarm is not triggered.

For situations where an article having an EAS tag is to be checked-in or returned to the controlled area, the EAS tag must be activated or re-attached to once again provide theft deterrence. Because of the desirability of source tagging, in which EAS tags are applied to articles at the point of manufacturing or distribution, it is typically preferable that the EAS tags be deactivatable and activatable rather than be removed from the articles. In addition, passing the article around the interrogation zone presents other problems because the EAS tag remains active and can interact with EAS systems in other controlled areas inadvertently activating those systems.

Radio-frequency identification ("RFID") systems are also generally known in the art and may be used for a number of applications, such as managing inventory, electronic access control, security systems, and automatic identification of cars on toll roads. An RFID system typically includes an RFID reader and an RFID device. The RFID reader may transmit a radio-frequency ("RF") carrier signal to the RFID device. The RFID device may respond to the carrier signal with a data signal encoded with information stored by the RFID device.

The market need for combining EAS and RFID functions in the retail environment is rapidly emerging. Many retail stores that now have EAS for shoplifting protection rely on bar code information for inventory control. RFID offers faster and more detailed inventory control over bar coding. Retail stores already pay a considerable amount for hard tags that are re-useable. Adding RFID technology to EAS hard tags can easily pay for the added cost due to improved productivity in inventory control as well as loss prevention.

In addition, in order to minimize interactions between the EAS and RFID elements, prior art combination approaches have placed the two different elements, i.e., the EAS element and the RFID element, far enough apart in an end-to-end, a side-by-side or a stacked manner so as to minimize the interaction of each element. However, these approaches all result in some level of increase in the overall size and/or footprint of the combination tag or label.

What is needed is a combination EAS and RFID tag in which the placement of the EAS element and the RFID element minimizes the coupling effects of the EAS element on the RFID element and thereby improves the overall read range of the RFID element, while minimizing any increase in overall size and/or footprint.

SUMMARY OF THE INVENTION

The present invention advantageously provides a security tag and system for securing objects. In one embodiment, the security tag includes an acousto magnetic ("AM") electronic article surveillance ("EAS") component that has a housing with a defined surface area. The housing of the AM EAS component can include a perimeter boundary that defines an EAS component plane. The security tag further includes a radio frequency identification ("RFID") component that has an integrated circuit and a dipole antenna defining a RFID component plane that is substantially coplanar with the EAS component plane. The integrated circuit and the dipole antenna are positioned externally along the perimeter boundary of the EAS component.

In accordance with another aspect, a system for securing objects is provided. The system includes a combination radio frequency identification ("RFID")/electronic article surveillance ("EAS") reader that generates RFID and EAS interrogation signals and a security tag that receives the interrogation signals and transmit response signals. The security tag includes an acousto magnetic ("AM") electronic article surveillance ("EAS") component that has a housing with a defined surface area. The housing of the AM EAS component can include a perimeter boundary that defines an EAS component plane. The security tag further includes a RFID component having an integrated circuit and a dipole antenna that define a RFID component plane that is substantially coplanar with the EAS component plane. The integrated circuit and the dipole antenna are positioned externally along the perimeter boundary of the EAS component.

In accordance with another aspect, the present invention provides a method for constructing a combination security tag. An acousto magnetic ("AM") electronic article surveillance ("EAS") component is provided in which the AM EAS component includes a perimeter boundary and an EAS component plane. A radio frequency identification ("RFID") component is affixed to the EAS component plane. The RFID component has an RFID dipole antenna. The dipole antenna has a first antenna portion and a separate second antenna portion in which the first antenna portion and the second antenna portion are positioned external to and at least partially surround the perimeter boundary of the EAS component. The method can further include connecting the first antenna portion and the second antenna portion to the RFID integrated circuit.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
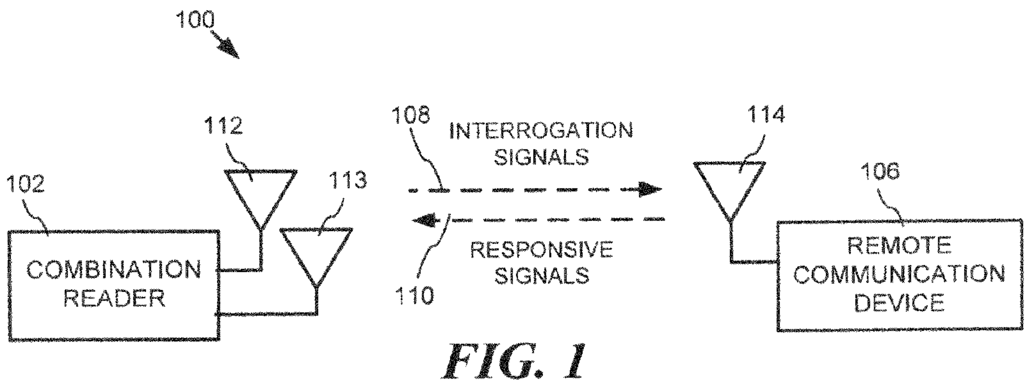
FIG. 1 is a block diagram of a combination electronic article surveillance/radio frequency identification detection system constructed in accordance with the principles of the present invention.

Referring now to the drawing figures in which like reference designators refer to like elements, there is shown in FIG. 1 a diagram of an exemplary system constructed in accordance with the principles of the present invention and designated generally as "100". Communication system 100 provides an electronic identification system in the embodiment described herein. Further, the described communication system 100 is configured for backscatter communications as described in detail below. It is contemplated that other communication protocols can be utilized in other embodiments.

The depicted communication system 100 includes at least one combination EAS/RFID reader 102 having at least one electronic wireless remote communication device 106. Low frequency ("LF") communications for EAS support and ultrahigh frequency ("UHF") communications for RFID support can occur between a combination reader 102 and remote communication devices 106 for use in identification systems and product monitoring systems as exemplary applications. Of note, although reader 102 is shown in FIG. 1 as supporting both RFID and EAS communications, it is understood that the present invention is not limited to such and separate RFID readers and EAS interrogation devices can be used in connection with the present invention.

Discussed below in detail, remote communication device 106 includes a radio frequency identification ("RFID") component and an EAS component in the embodiments described herein. Multiple wireless remote communication devices 106 typically communicate with combination reader 102 although only one such device 106 is illustrated in FIG. 1.

Although multiple communication devices 106 can be employed in communication system 100, there is typically no communication between the multiple communication devices 106 themselves. Instead, the multiple communication devices 106 communicate with combination reader 102. Multiple communication devices 106 can be used in the same field of combination reader 102, i.e., within the communication range of combination reader 102. Similarly, multiple combination readers 102 can be in proximity to one or more of communication devices 106.

Remote communication device 106 is configured to interface with combination EAS/RFID reader 102 using a wireless medium in one embodiment. More specifically, communication between communication device 106 and reader 102 occur via an electromagnetic link, such as an RF link, e.g., at microwave frequencies, for the RFID component and LF for the EAS component in the described embodiment. Combination reader 102 is configured to output forward link wireless RFID and EAS communication signals 108. Further, combination reader 102 is operable to receive return link wireless communication signals 110, e.g., EAS and RFID reply signals, from devices 106 responsive to the forward link communication signals 108. In accordance with the above, forward link communication signals and return link communication signals are wireless signals, such as radio frequency signals. Other forms of communication signals, such as infrared, acoustic, and the like are contemplated.

Combination reader unit 102 includes at least one RFID antenna 112 and at least one EAS antenna 113, as well as transmitting and receiving circuitry to transmit and receive the RFID and EAS interrogation signals. RFID antenna 112 comprises a transmit/receive RFID antenna connected to combination reader 102. EAS antenna includes a transmit/receive EAS antenna also connected to combination reader 102. In an alternative embodiment, reader 102 can have separate transmit and receive antennas for the RFID and/or EAS subsystems.

In operation, combination reader 102 transmits forward link communication EAS and/or RFID signals 108, e.g., interrogation and/or command signals, via antennas 112 and 113. Communication device 106 is operable to receive the incoming forward link signals 108. Upon receiving EAS and/or RFID signals 108, communication device 106 responds by communicating the responsive return link communication signal(s) 110, e.g., a responsive RFID reply signal and/or return EAS signal. Communications within system 100 are described in greater detail below.

In one embodiment, responsive return link communication signal 110, e.g., a responsive RFID reply signal, is encoded with information that uniquely identifies or labels the particular device 106 that is transmitting so as to identify any object, animal, or person with which communication device 106 is associated. Communication devices 106 can be combination RFID/EAS tags that are attached to objects or people where the RFID portion of each tag is programmed with information relating to the object or person to which it is attached. The information can take a wide variety of forms and can be more or less detailed depending on how the information will be used. For example, the information may include merchandise identification information, such as a universal product code. The RFID portion of a tag may include identifying information and security clearance information for an authorized person to whom the tag has been issued. A tag may also have a unique serial number, in order to uniquely identify an associated object or person. Alternatively, the RFID portion of a tag may include more detailed information relating to an object or person, such as a complete description of the object or person. As a further exemplary alternative, the RFID portion of a tag may store a single bit, in order to provide for theft control or simple tracking of entry and departure through the detection of an object or person at a particular reader, without necessarily specifically identifying the object or person.

Remote communication device 106 is configured to output EAS and/or RFID reply signal(s) within reply link communication 110 responsive to receiving forward link EAS and/or RFID wireless communication signal(s) 108. Combination reader 102 is configured to receive and recognize the reply signal(s) within the reply link communication signal 110, e.g., EAS and/or RFID return signal(s). The reply signal(s) can be utilized to identify the particular transmitting communication device 106 and may include various types of information corresponding to the communication device 106 including but not limited to stored data, configuration data or other command information. The EAS component portion of communication device can also be activated to allow detection of the device 106 in an EAS interrogation zone established by combination reader 102. Conversely, the EAS component portion of communication device can also be deactivated so that the EAS component is not detected in an EAS interrogation zone established by combination reader 102. Further, it is contemplated that system 100 can be arranged to read the RFID portion of communication device 106 when an activated EAS component portion is detected in an interrogation zone.

Figure 2:
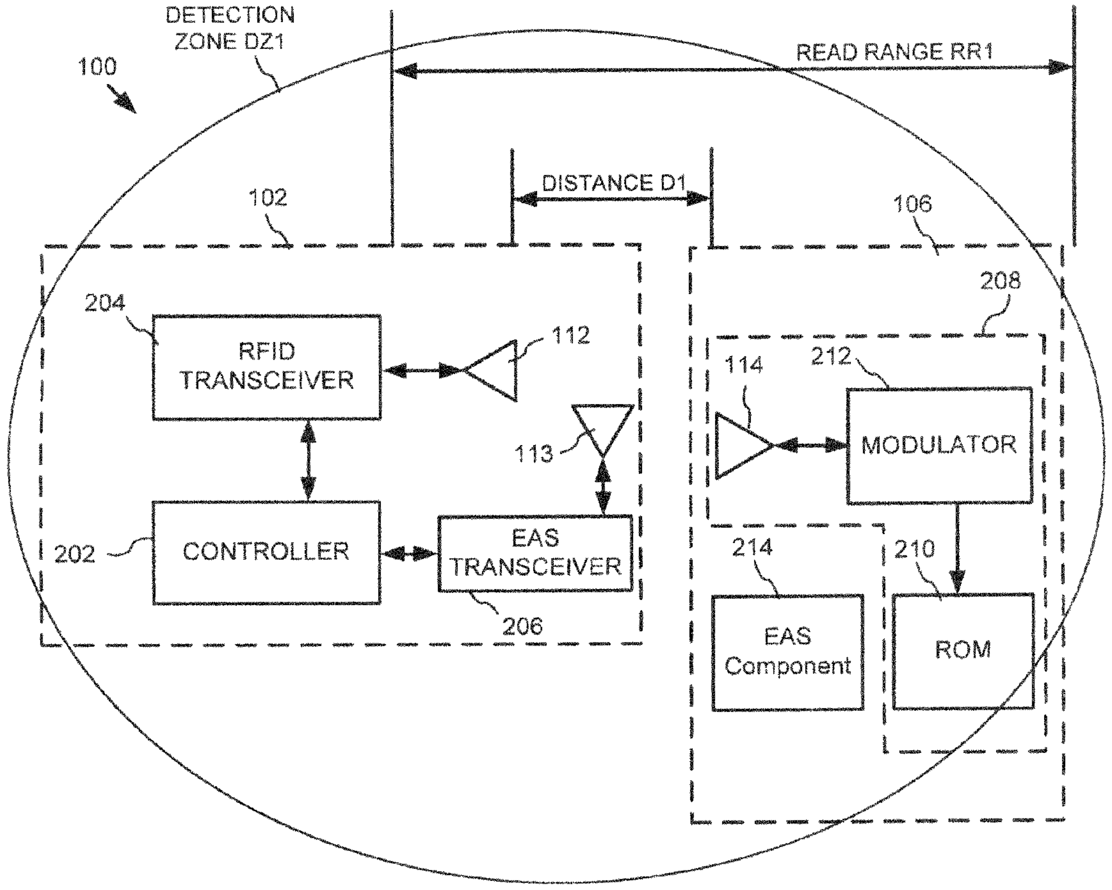
FIG. 2 is a more detailed embodiment of the combination electronic article surveillance/radio frequency identification detection system of FIG. 1.

FIG. 2 shows an RFID system 100 configured to operate using one or more remote communication devices 106. As illustrated in FIG. 2, remote communication device 106, e.g., a security tag, is physically separated from RFID reader 102 by a distance "D1". Remote communication device 106 includes an RFID component 208 having an operating frequency in the ultra high frequency ("UHF") band, which is considered as frequencies 300 MHz up to 3 GHz. RFID system 100, however, can also be configured to operate RFID component 208 using other portions of the RF spectrum as desired for a given implementation. The embodiments are not limited in this context. Remote communication device 106 also includes EAS component 214, e.g., an EAS tag or label. In accordance with one aspect of the present invention, EAS component 214 is an acousto magnetic (AM) tag or label. An exemplary AM EAS component 214 operates in the LF frequency band 30 kHz-300 kHz and in particular 58 kHz.

A EAS detection distance D1 is defined as the distance from antenna 113 such that the EAS element is detected due to the EM field from antenna 113. The RFID read range RR1 depends on the UHF field radiated from antenna 112. The UHF field is used to activate the RFID component 208 and will generally do so long as the RFID component is within read range RR1. Once the RFID component 208 is activated, it may then transmit the information stored in its memory register, e.g., ROM (or NVRAM) 210, via response signal 110.

EAS component 214, e.g., an acousto-magnetic ("AM") resonating member and a biasing element for EAS detection includes a housing (not shown) that encloses the AM resonating member and biasing element. The housing has a defined surface area and the defined surface area has a perimeter boundary that defines an EAS component plane EAS component 214 also affects the RFID read range RR1. For example, when the RFID component 208 and the EAS component 214 are packaged together and have some degree of overlap and some degree of separation, e.g., by a gap, the EAS component 214 can cause substantial de-tuning and signal loss for the RFID component 208, which results in a reduction of the RFID read range of the combination tag 106. The detection performance of the EAS element is not affected by the presence of the UHF RFID element. For example, in a combination tag 106 where the EAS element 214 and the RFID component 208 are stacked on top of the other with a gap of approximately 2 mm between these components an RFID read range is approximately 80 to 90 cm. In another embodiment of combination tag 106, a 1 mm spacer placed between the stacked EAS element 214 and the RFID component 208 results in a measured RFID read range of approximately 30 to 40 cm.

In contrast, for a combination tag 106 where the RFID integrated circuit 306 (FIG. 3) and the RFID antenna 304 (FIG. 3) of RFID component 208 are positioned externally along the perimeter boundary of the EAS component 214 an RFID read range of greater than 100 cm has been measured. Thus, externally positioning the RFID antenna 304 (FIG. 3) of RFID component 208 along the perimeter boundary of the EAS component 214 advantageously results in significantly increased RFID read range, while minimizing the overall increase of the combination tag 106 footprint.

Combination reader 102 includes controller 202 that controls RFID transceiver 204 and EAS transceiver 206. Controller 202 can be a microprocessor, microcontroller or other similar components that directs the operation of combination reader 102. RFID transceiver 204 can be any RFID transceiver known in the art to transmit and receive RFID interrogation signals using antenna 112. EAS transceiver 206 can be any EAS transceiver known in the art to transmit and receive EAS interrogation signals using EAS antenna 113.

Figure 3:
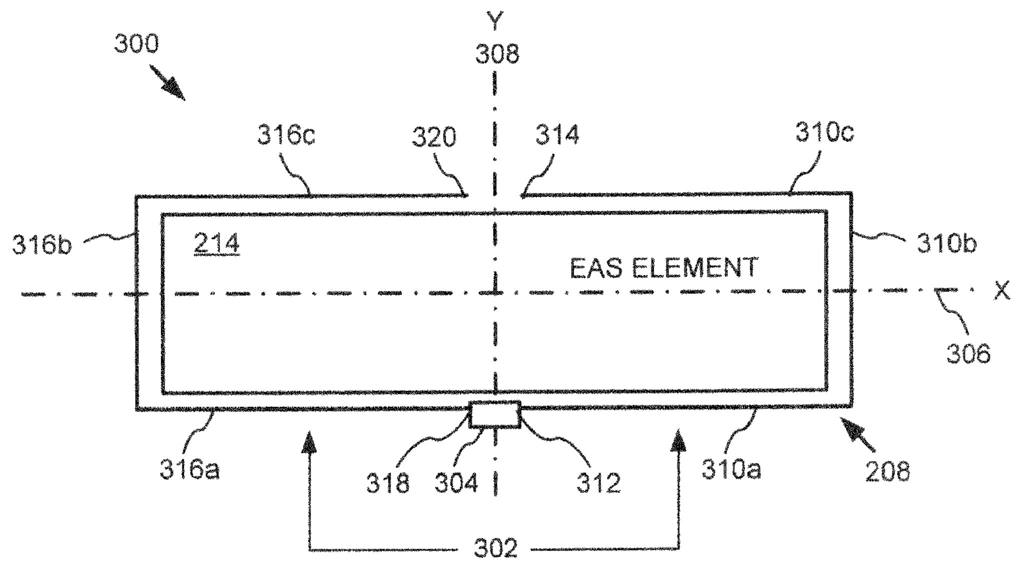
FIG. 3 is a diagram of an exemplary tag having an antenna constructed in accordance with the principles of the present invention.

FIG. 3 illustrates a combination security tag 300 constructed in accordance with the principles of the present invention. In this embodiment, the combination security tag 300 includes EAS component 214, which is substantially rectangular in shape but also may have various other geometrical shapes to meet packaging and performance parameters and RFID component 208 that includes antenna 302 connected to integrated circuit chip 304. It is understood that RFID component 208 and EAS component 214 can define a longitudinal axis 306 that is substantially parallel to the proximal and distal longer edges of EAS component 214 and intersects the center point of EAS component 214. Longitudinal axis 306 lies along the x-axis and divides the EAS component 214 into a distal half and a proximal half. EAS component 214 also defines a transverse axis 308 that is parallel to the left and right short edges of EAS component 214, perpendicular to the longitudinal axis 306 and intersects the center point of EAS component 214. Transverse axis 308 lies along the y-axis and divides the EAS component 214 into a left first half and a right second half.

Antenna 302 can have multiple antenna portions connected to either side of RFID integrated circuit chip 304. The first antenna portion includes segments 310*a*, 310*b* and 310*c*. The first antenna portion connects to RFID integrated circuit chip 304 at point 312. The first antenna portion ends at point 314. Similarly, the second antenna portion of antenna 302 includes segments 316*a*, 316*b* and 316*c*. The second antenna portion connects to RFID integrated circuit chip 304 at point 318. The second antenna portion ends at point 320. It is contemplated that the first antenna portion and the second antenna portion can be symmetric about transverse axis 308 or longitudinal axis 306. RFID integrated circuit chip 304 has conductive pads electrically connected to both antenna portions at points 312 and 318. In this embodiment, RFID integrated circuit chip 304 and connecting antenna portions can be placed 1 to 5 mm outside the boundary perimeter along the proximal longer edge of EAS component 214. In a further embodiment, connecting antenna portions may be placed up to 10 mm outside the boundary perimeter along the proximal longer edge of the EAS component 214.

The first antenna portion, including linear antenna segments 310*a*, 310*b* and 310*c* connects to one side of the RFID integrated circuit chip 304. From point 312, segment 310*a* linearly extends in a direction substantially parallel to the x-axis along the longer edge of EAS component 214. Segment 310*b* joins segment 310*a* and continues along the path substantially parallel to the y-axis along the short edge of EAS component 214. Segment 310*c* joins segment 310*b* and continues to end point 314 along the path substantially parallel to the x-axis along the longer distal edge of EAS component 214.

The second antenna portion of antenna 302, including linear antenna segments 316*a*, 316*b*, and 316*c*, connects to the other side of RFID integrated circuit chip 304 at point 318. From point 318, segment 316*a* linearly extends in a direction substantially parallel to the x-axis along the longer edge of EAS component 214. Segment 316*b* joins segment 316*a* and continues along the path substantially parallel to the y-axis along the short edge of EAS component 214. Segment 316*c* joins segment 316*b* and continues to end point 320 along the path substantially parallel to the x-axis along the longer distal edge of EAS component 214.

Both antenna end segments 310*c* and 316*c* can be modified by further extension and wrapping or by further reduction to achieve the appropriate resonance frequency for wireless communication.

The placement of the antenna 302 around the perimeter boundary or region of the EAS component 214 advantageously reduces the electrical losses caused by EAS component 214 and allows a substantially co-planar arrangement among the components. By eliminating the stacking of the RFID component 208 on the EAS component 214, a significant improvement in the RFID read range can be obtained.

Figure 4:
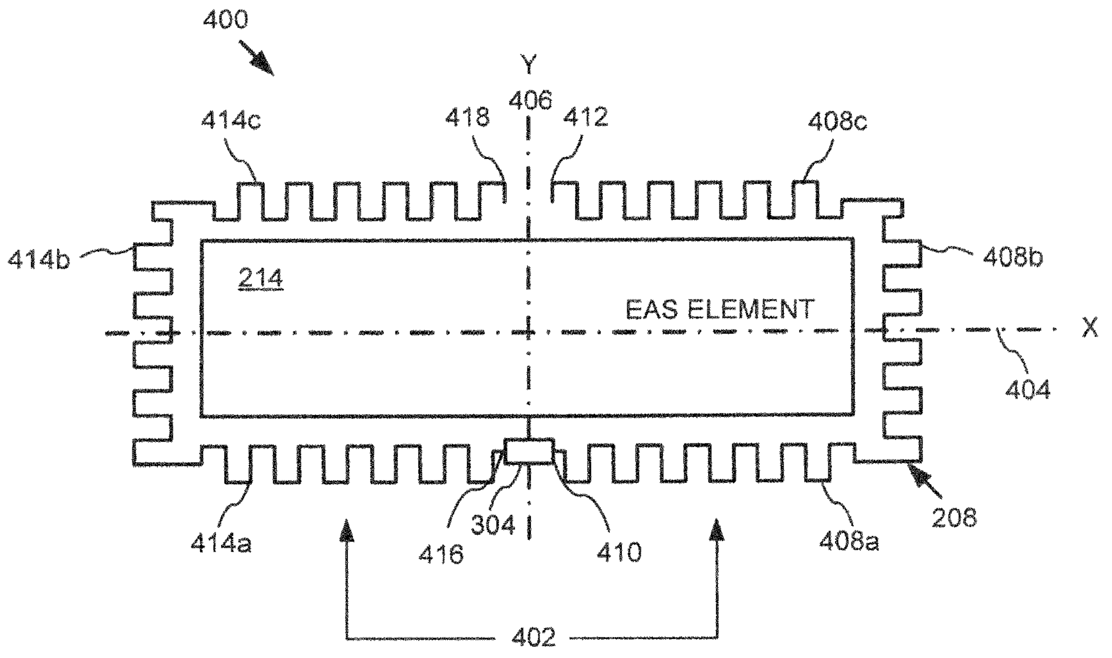
FIG. 4 is a diagram of another exemplary tag having an antenna constructed in accordance with the principles of the present invention.

FIG. 4 illustrates another embodiment of a combination security tag 400 constructed in accordance with the principles of the present invention. In this embodiment, the combination security tag 400 also includes EAS component 214, which is substantially rectangular in shape but also may have various other geometrical shapes to meet packaging and performance parameters and RFID component 208. In accordance with this embodiment, RFID component 208 includes antenna 402 connected to RFID integrated circuit chip 304. It is understood that RFID component 208 and EAS component 214 can define a longitudinal axis 404 that is substantially parallel to the proximal and distal longer edges of EAS component 214 and intersects the center point of EAS component 214. Longitudinal axis 404 lies along the x-axis and divides the EAS component 214 into a distal half and a proximal half. EAS component 214 also defines a transverse axis 406 that is parallel to the left and right short edges of EAS component 214, perpendicular to the longitudinal axis 404 and intersects the center point of EAS component 214. Transverse axis 406 lies along the y-axis and divides the EAS component 214 into a left first half and a right second half.

Antenna 402 can have multiple antenna portions connected to either side of RFID integrated circuit chip 304. The first antenna portion includes meanderline segments 408*a*, 408*b* and 408*c*. The first antenna portion connects to RFID integrated circuit chip 304 at point 410. The first antenna portion ends at point 412. Similarly, the second antenna portion of antenna 402 includes meanderline segments 414*a*, 414*b* and 414*c*. The second antenna portion connects to RFID integrated circuit chip 304 at point 416. The second antenna portion ends at point 418. It is contemplated that the first antenna portion and the second antenna portion can be symmetric about transverse axis 406 or longitudinal axis 404. RFID integrated circuit chip 304 has conductive pads electrically connected to both antenna portions at points 410 and 416. In this embodiment, RFID integrated circuit chip 304 and connecting antenna portions can be placed 1 to 5 mm outside the boundary perimeter along the proximal longer edge of EAS component 214. In a further embodiment, connecting antenna portions may be placed up to 10 mm outside the boundary perimeter along the proximal longer edge of the EAS component 214.

The first antenna portion of antenna 402, including meanderline antenna segments 408*a*, 408*b* and 408*c*, connects to one side of the RFID integrated circuit chip 304. From point 410, meanderline segment 408*a* linearly extends in a direction substantially parallel to the x-axis along the longer edge of EAS component 214. Meanderline segment 408*b* joins segment 408*a* and continues along the path substantially parallel to the y-axis along the short edge of EAS component 214. Meanderline segment 408*c* joins segment 408*b* and continues to end point 412 along the path substantially parallel to the x-axis along the longer distal edge of EAS component 214.

The second antenna portion of antenna 302, including meanderline antenna segments 414*a*, 414*b*, and 414*c*, connects to the other side of RFID integrated circuit chip 304 at point 416. From point 416, meanderline segment 414*a* linearly extends in a direction substantially parallel to the x-axis along the longer edge of EAS component 214. Meanderline segment 414*b* joins meanderline segment 414*a* and continues along the path substantially parallel to the y-axis along the short edge of EAS component 214. Meanderline segment 414*c* joins segment 414*b* and continues to end point 418 along the path substantially parallel to the x-axis along the longer distal edge of EAS component 214.

Both antenna end segments 408*c* and 414*c* can be modified by further extension and wrapping or by further reduction to achieve the appropriate resonance frequency for wireless communication.

Although FIG. 4 illustrates that the geometry of antenna segments 408 and 414 are meanderline antenna segments, the present invention is not limited to such. It is contemplated that these segments and can have other geometrical shapes as well.

The placement of the RFID antenna 402 around the perimeter boundary or region of the tag or label 400 advantageously reduces the electrical losses resulting from the presence of the EAS component 214. In addition, the longer the antenna line length of the antenna pattern, e.g., the meanderline antenna pattern in FIG. 4, the lower the RFID frequency resonance that can be achieved on tag or label of a given size.

It should be noted that although the antenna portions are shown as symmetrical in FIGS. 3 and 4, e.g., the antenna portion comprised of segments 310*a-c* is symmetrical with antenna portion comprised of segments 316*a-c* about transverse axis 308 in FIG. 3 and the antenna portion comprised of segments 408*a-c* is symmetrical with antenna portion comprised of segments 414$a$-$c$ about transverse axis 406 in FIG. 4, the present invention is not limited to such. It is contemplated that the antenna portions need not be symmetrically arranged about either the longitudinal axis or transverse axis. Accordingly, although RFID integrated circuit chip 3034 is shown as positioned about transverse axes 308 and 406, the present invention is not limited to such. RFID chip 304 can be positioned anywhere along the perimeter boundary or region of tags or labels 300 or 400 with the antenna portions likewise being positioned along the perimeter boundary or region of tags or labels 300 or 400.

In addition, it is noted that the RFID antennas shown in FIGS. 3 and 4 are arranged as dipole antennas. Referring to FIG. 3, in accordance with this arrangement, end points 320 and 314 do not touch. The result is that the antenna portion comprised of segments 310$a$-$c$ is separated from and does not form a loop with the antenna portion comprised of segments 316$a$-$c$. Similarly, referring to FIG. 4, in accordance with this arrangement, end points 412 and 418 do not touch. As such, the antenna portion comprised of segments 408$a$-$c$ is separated from and does not form a loop with the antenna portion comprised of segments 414$a$-$c$. In accordance with an embodiment of the invention the impedance of the RFID antenna 302 (and 402) is approximately the complex conjugate of the RFID chip 304.

Figure 5:
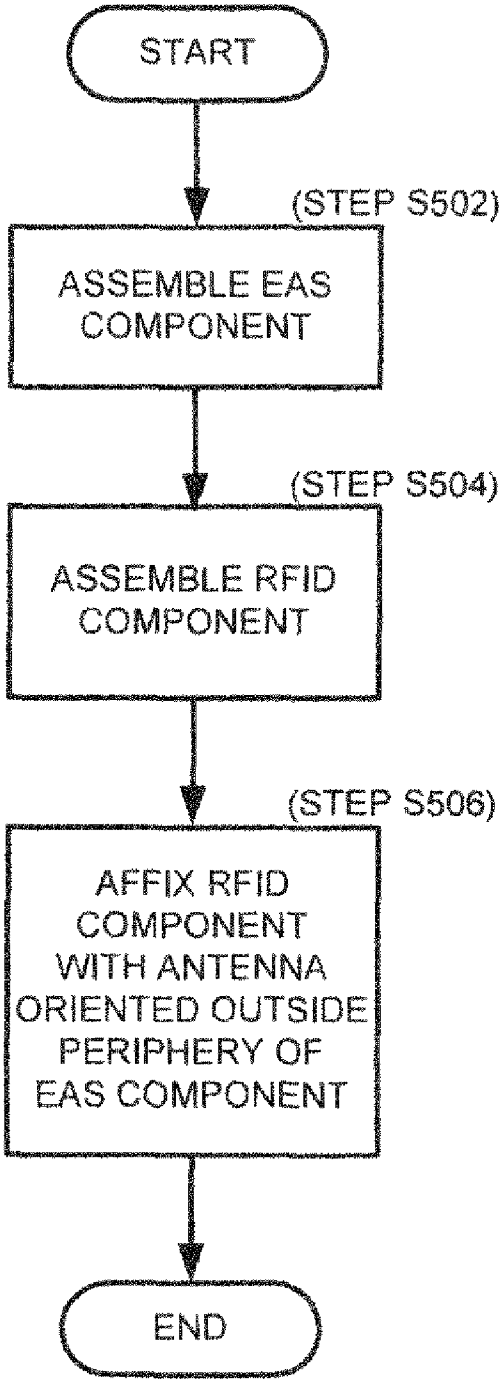
FIG. 5 is an exemplary process for constructing a combination security tag in accordance with the principles of the present invention.

FIG. 5 is an exemplary process for constructing a combination security tag 106 in accordance with the principles of the present invention. Referring to FIGS. 2, 3 and 5, at step S502, an EAS component 214, which has a perimeter boundary, is assembled. The EAS component 214 can be disposed in a separate structure such as inside a hard EAS tag or the EAS component 214 itself can form the housing, i.e., the housing encloses the magneto-acoustic and bias elements. In the case of a separate structure such as a hard tag, the portion of the hard tag immediately surrounding the EAS magneto-acoustic and biasing elements is considered the housing for purposes of the present invention. At step S504, an RFID component 208, is assembled. Methods and techniques for the actual physical fabrication, e.g., printing of the antenna and affixation of RFID integrated circuit chip 304/406 are known, of RFID component 208 are generally known. It is noted however that, in accordance with the present invention, the antenna is arranged such that, when RFID component 208 is mated with EAS component 213, the antenna is disposed on the RFID component 208 such that it is external to the perimeter boundary of the EAS component 214.

At step S506, RFID component 208 is affixed to the housing, e.g., affixed to EAS component 214 such that the RFID antenna is external to the perimeter boundary of the EAS component 214. In one embodiment, the first portion and the second portion of the RFID antenna 304 can partially surround approximately 50% or more of the perimeter boundary of the EAS component 214.

The present invention advantageously provides an apparatus and detection system for enhancing the RFID read range of combination security tags having EAS components and RFID components in a single package.

The present invention can be realized in hardware, software, or a combination of hardware and software. It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A security tag comprising:

an acousto magnetic ("AM") electronic article surveillance ("EAS") component, the AM EAS component including a housing with a defined surface area, the defined surface area having a perimeter boundary and defining an EAS component plane; and a radio frequency identification ("RFID") component, the RFID component including an RFID integrated circuit and a dipole antenna, the integrated circuit and the dipole antenna defining a RFID component plane, the RFID component plane being substantially coplanar with the EAS component plane, the integrated circuit and the dipole antenna being positioned externally along the perimeter boundary of the AM EAS component, a first branch of the dipole antenna folded around a first half of the perimeter boundary of the AM EAS component, a second branch of the dipole antenna folded around a second half of the perimeter boundary of the AM EAS component, the first branch and the second branch being coplanar with the EAS component plane and forming a gap between ends of the first and second branches, the gap being on an opposite side of the perimeter boundary from a location of the RFID integrated circuit;

wherein the RFID antenna has an antenna impedance that includes the proximity effects of the EAS component, and wherein an impedance of the RFID antenna is approximately the complex conjugate of the RFID chip.

2. The security tag of claim 1, wherein the dipole antenna surrounds at least 50 percent of the perimeter boundary of the EAS component.

3. The security tag of claim 1, wherein the first and second branches are positioned up to 10 mm outside the perimeter boundary of the EAS component.

4. The security tag of claim 1, wherein the first and second antenna portions include at least one linear antenna segment.

5. The security tag of claim 1, wherein the first and second branches include at least one meanderline antenna segment.

6. The security tag of claim 1, wherein the first and second branches are positioned asymmetrically with respect to at least one of an EAS component transverse axis and an EAS component longitudinal axis.

7. The security tag of claim 1, wherein the body includes a transverse axis, the first and second branches being symmetric about the transverse or longitudinal axis.

8. The security tag of claim 1, wherein the RFID component is affixed to the EAS housing.

9. A combination radio frequency identification ("RFID")/electronic article surveillance ("EAS") system, the system comprising:

a radio frequency identification reader generating EAS and RFID interrogation signals; and a security tag arranged to receive the EAS and RFID interrogation signals and transmit a response signal, the security tag comprising:

an acousto magnetic ("AM") EAS component, the EAS component including a housing with a defined surface area, the defined surface area having a perimeter boundary and defining an EAS component plane; and a RFID component, the RFID component including an RFID integrated circuit and a dipole antenna, the integrated circuit and the dipole antenna defining a RFID component plane, the RFID component plane being substantially coplanar with the EAS component plane, the integrated circuit and the dipole antenna being positioned externally along the perimeter boundary of the EAS component, a first branch of the dipole antenna folded around a first half of the perimeter boundary of the AM EAS component, a second branch of the dipole antenna folded around a second half of the perimeter boundary of the AM EAS component, the first branch and the second branch being coplanar with the EAS component plane and forming a gap between ends of the first and second branches, the gap being on an opposite side of the perimeter boundary from a location of the RFID integrated circuit;

wherein the RFID antenna has an antenna impedance that includes the proximity effects of the EAS component, and wherein an impedance of the RFID antenna is approximately the complex conjugate of the RFID chip.

10. The system of claim 9, wherein the antenna surrounds at least 50 percent of the perimeter boundary of the EAS component.

11. The system of claim 9, wherein the first and second branches are positioned up to 10 mm outside of the perimeter boundary of the EAS component.

12. The system of claim 9, wherein the first and second branches include at least one linear antenna segment.

13. The system of claim 9, wherein the first and second branches include at least one meanderline antenna segment.

14. The system of claim 9, wherein the first branch is arranged a counterclockwise direction extending from the RFID integrated circuit, and the second branch is arranged in a clockwise direction extending from the RFID integrated circuit.

15. The system of claim 9, wherein the housing includes a transverse axis and a longitudinal axis perpendicular to the transverse axis, the first branch and the second branch being symmetric about one of the transverse axis and the longitudinal axis.

16. The system of claim 9, wherein the RFID component is affixed to the EAS housing.

17. A method of constructing a combination tag, the method comprising:

providing an acousto magnetic ("AM") electronic article surveillance ("EAS") component, the AM EAS component including a perimeter boundary; and affixing a radio frequency identification ("RFID") component to the EAS component, the RFID component having an RFID dipole antenna, a first branch of the dipole antenna folded around a first half of the perimeter boundary of the AM EAS component, a second branch of the dipole antenna folded around a second half of the perimeter boundary of the AM EAS component, the first branch and the second branch being coplanar with the EAS component plane and forming a gap between ends of the first and second branches, the gap being on an opposite side of the perimeter boundary from a location of an RFID integrated circuit;

wherein the RFID antenna has an antenna impedance that includes the proximity effects of the EAS component, and wherein an impedance of the RFID antenna is approximately the complex conjugate of the RFID chip.

18. The method of claim 17, wherein the first and second branches are positioned asymmetrically with respect to at least one of an EAS component transverse axis and an EAS component longitudinal axis.

19. The method of claim 17, wherein the first and second branches include at least one meanderline antenna segment.

* * * * *